(12) United States Patent
Guo et al.

(10) Patent No.: US 8,346,765 B2
(45) Date of Patent: Jan. 1, 2013

(54) GENERATING RANKED SEARCH RESULTS USING LINEAR AND NONLINEAR RANKING MODELS

(75) Inventors: Ning Guo, Hangzhou (CN); Fei Xing, Hangzhou (CN); Yuheng Xie, Hangzhou (CN); Lei Hou, Beijing (CN); Qin Zhang, Hangzhou (CN)

(73) Assignee: Alibaba Group Holding Limited, George Town, Grand Cayman (KY)

( * ) Notice: Subject to any disclaimer, the term of this patent is extended or adjusted under 35 U.S.C. 154(b) by 212 days.

(21) Appl. No.: 12/802,816

(22) Filed: Jun. 14, 2010

(65) Prior Publication Data

US 2010/0325105 A1    Dec. 23, 2010

(30) Foreign Application Priority Data

Jun. 19, 2009  (CN) .......................... 2009 1 0146331

(51) Int. Cl.
G06F 17/30   (2006.01)

(52) U.S. Cl. ........ 707/723; 707/705; 707/706; 707/722; 707/724; 707/725; 707/769

(58) Field of Classification Search .................. 707/723, 707/748, 752–753, 705–706, 722, 724–725, 707/769
See application file for complete search history.

(56) References Cited

U.S. PATENT DOCUMENTS

| | | | |
|---|---|---|---|
| 5,933,822 A * | 8/1999 | Braden-Harder et al. | ............ 1/1 |
| 6,236,768 B1 * | 5/2001 | Rhodes et al. | ............... 382/306 |
| 6,249,784 B1 * | 6/2001 | Macke et al. | ........................ 1/1 |
| 6,327,590 B1 * | 12/2001 | Chidlovskii et al. | .......... 707/734 |
| 6,353,825 B1 * | 3/2002 | Ponte | .................................... 1/1 |
| 6,490,579 B1 * | 12/2002 | Gao et al. | ...................... 707/707 |
| 6,654,742 B1 | 11/2003 | Kobayashi et al. | |
| 6,738,764 B2 | 5/2004 | Mao et al. | |
| 6,751,612 B1 * | 6/2004 | Schuetze et al. | ............. 707/709 |
| 6,871,202 B2 | 3/2005 | Broder | |
| 6,947,924 B2 * | 9/2005 | Bates et al. | .................. 707/708 |
| 7,206,780 B2 | 4/2007 | Slackman | |
| 7,603,350 B1 | 10/2009 | Guha | |
| 7,617,176 B2 | 11/2009 | Zeng et al. | |
| 7,644,072 B2 * | 1/2010 | Budzik et al. | ................. 707/748 |
| 7,761,447 B2 | 7/2010 | Brill et al. | |
| 8,060,456 B2 * | 11/2011 | Gao et al. | ........................ 706/12 |
| 8,126,883 B2 * | 2/2012 | Qiu | .............................. 707/723 |
| 2002/0194166 A1 * | 12/2002 | Fowler | .............................. 707/3 |
| 2006/0161534 A1 | 7/2006 | Carson, Jr. et al. | |
| 2007/0033228 A1 | 2/2007 | Fassett et al. | |

(Continued)

FOREIGN PATENT DOCUMENTS

CN      101233513 A      7/2008

*Primary Examiner* — Frantz Coby

(74) *Attorney, Agent, or Firm* — Van Pelt, Yi & James LLP

(57) ABSTRACT

Generating ranked search results includes receiving a plurality of matching information items that match a search request, ranking at least some of the plurality of matching information items using a linear ranking model that linearly combines a first plurality of feature values to obtain a first set of ranked results, ranking at least some of the first set of ranked results using a nonlinear ranking model that nonlinearly combines a second plurality of feature values to obtain a second set of ranked results, and provide a search response based on the second set of ranked results.

16 Claims, 4 Drawing Sheets

U.S. PATENT DOCUMENTS

| | | |
|---|---|---|
| 2007/0136272 A1 | 6/2007 | Tveit |
| 2007/0192293 A1 | 8/2007 | Swen |
| 2008/0028308 A1 | 1/2008 | Brownlee et al. |
| 2008/0154888 A1 | 6/2008 | Buron et al. |
| 2009/0106229 A1 | 4/2009 | Burges |
| 2009/0276414 A1 | 11/2009 | Gao et al. |

* cited by examiner

GENERATING RANKED SEARCH RESULTS USING LINEAR AND NONLINEAR RANKING MODELS

CROSS REFERENCE TO OTHER APPLICATIONS

This application claims priority to People's Republic of China Patent Application No. 200910146331.5 entitled SEARCH RESULT GENERATING METHOD AND INFORMATION SEARCH SYSTEM filed Jun. 19, 2009 which is incorporated herein by reference for all purposes.

FIELD OF THE INVENTION

The present application relates to the field of computer applications, and in particular to generation of search results.

BACKGROUND OF THE INVENTION

An information search system is a system capable of providing a user with information retrieval service. Taking the search engine which is widely used on the Internet as an example, the search engine, as a search system applied in the field of Internet, has become an indispensable assistance tool for users accessing the web. From a perspective of the user, the search engine typically provides a webpage containing a search box, and the user inputs in the search box a keyword or another search condition. The keyword is submitted through a browser to the search engine, which in turn returns information that match the contents of the keyword input by the user.

In response to the same search request of the user (e.g., a search keyword input by the user searching for information), the search engine typically retrieves information items that match the request, the number of which may be up to tens to tens of thousands. From the perspective of the user, however, his attention is usually focused on the information highly ranked among the search results. Thus, how to rank search information that is particularly important directly influences the user's experience with the search engine.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For, the purpose of clarity, technical material that is known in the technical fields related to the invention has not been described in detail so that the invention is not unnecessarily obscured.

Generating ranked search results is disclosed. In some embodiments, information items (such as documents, objects, etc.) in a database that match a search request are ranked using a linear model that linearly combines feature values associated with the information items to obtain a first set of ranked results. At least some of the first set of ranked results are ranked again using a nonlinear model that combines feature values in a nonlinear fashion to obtain a second set of ranked results. A search result based on the second set of ranked result is provided and displayed to the user. In some embodiments, information items are optionally preprocessed before the linear model is applied.

Figure 1:
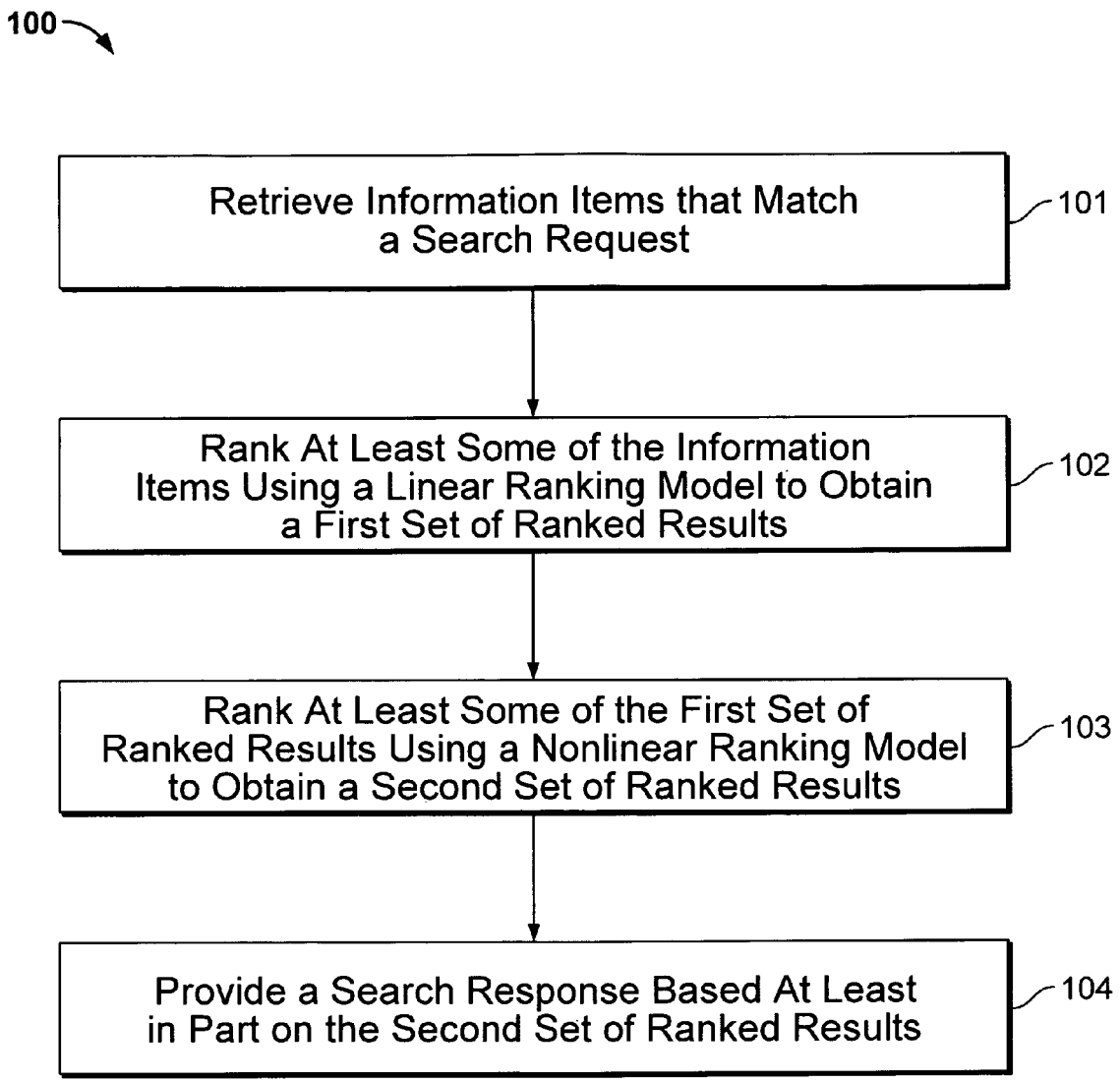
FIG. 1 is a flowchart illustrating an embodiment of a process for generating a search result.

FIG. 1 is a flowchart illustrating an embodiment of a process for generating a search result. Process 100 may be performed on a system such as 400 of FIG. 4.

At 101, information items that match a search request are retrieved. The information items may be documents, objects, or other appropriate items in a database. For example, in an Internet based search engine environment, the information items may correspond to web pages.

A user typically inputs one or more search conditions to search for information. A commonly used search condition is a search keyword. Some search engines can further support more types of search conditions dependent upon specific search application requirements, such as the time when information is published, an attribute of information, etc. In some embodiments, various search conditions are collectively referred to as a search request. The search engine retrieves information that matches the search request upon reception of the search request. Different types of information can be retrieved according to different search application requirements. For example, information retrieved in a webpage search relates to a webpage, information retrieved in an electronic commerce search relates to a product for sale, information retrieved in a document search relates to a periodical or paper, etc. Multiple items of matching information are retrieved in this example.

At 102, at least some of the matching information items are ranked using a linear ranking model to obtain a first set of ranked results.

In this example, the linear ranking model is used to score items of matching information, which are then sorted in an order of descending rank scores.

The linear ranking model is a model in which values associated with features of the matching information ($x_i$) are combined in a linear fashion using on weight coefficients ($a_i$). The linear model includes constants or first degree terms. In some embodiments, the linear ranking model is expressed mathematically as follows:

$$y = f(x_1, x_2, \ldots, x_n) = a_1 x_1 + a_2 x_2 + \ldots + a_n x_n \quad (1)$$

In the example model above, the dependent variable y has a linear relationship with the respective independent variables, where input parameters to the model, $x_1, x_2, \ldots, x_n$, referred to as feature values of the matching information, represent the factors to be taken into account for ranking, and $a_1, a_2, \ldots, a_n$ represent weight coefficients of the respective features. Thus, $a_i$ reflects the importance of a feature that corresponds to $x_i$ in ranking. The output from the model, y, represents a rank score of the matching information.

In view of a specific search application demand, the system can score the respective items of matching information based on one or more features of the matching information. These features may relate to different aspects exemplified as follows:

1) The number of times that a search keyword appears in the matching information. Generally, the more times a search keyword appears in a matching information item, the higher the matching information item shall be scored.

2) The location of a search keyword in the matching information. Generally, if a search keyword appears in an important section, e.g., the title, the abstract, etc., of a matching information item, then the matching information item shall be relatively highly scored.

3) The number of user feedbacks for the matching information. The number of user feedbacks can reflect the degree to which users pay attention to an information item. In some embodiments, the search engine obtains the numbers of user feedbacks corresponding to the respective matching information items through reading user feedback logs, and scores the respective matching information items according to the numbers of user feedbacks. The underlying assumption is that the more attention is paid to an information item, the higher it shall be scored.

4) The source of the matching information. In a webpage search, for example, the matching information can be relatively highly scored if it originates from a large portal website or an official website.

Only a few common features of the matching information have been listed as above, and many other features of the matching information can alternatively or additionally be used for scoring.

In some embodiments, the types and number of features used in a ranking model are determined along with the model. In order to rank the matching information, the system first obtains the values of the respective features of the respective matching information items, then scores the respective matching information items based on the ranking model, and finally ranks the respective matching information items according to the rank scores.

For example, in embodiments where 3 features are used in the linear ranking model, the ranking model is expressed as $y = f(x_1, x_2, x_3)$. If there are 10 matching information items that are returned, 10 sets of inputs ($x_1, x_2, x_3$) that correspond to the 10 matching information items are obtained, and 10 values of y are computed respectively, and the values are ranked.

At 103, at least some of the first set of ranked results are further ranked using a nonlinear ranking model to obtain a second set of ranked results. The nonlinear ranking model is a model in which a nonlinear function is applied to the features of the matching information to obtain a ranking output. The function employed by the nonlinear ranking model includes terms other than constants or first order terms.

The matching information is nonlinearly ranked to better accommodate a practical demand of the user. In various search systems, the respective features of the matching information objectively have a correspondence relationship with their resulting rank scores. Since this relationship is not necessarily a linear relationship, in some embodiments, a nonlinear ranking model is built to depict this correspondence relationship and identify information that better accommodate an actual demand of the user. Many different nonlinear functions are possible for representing the nonlinear ranking model and can be determined empirically. One way to determine the nonlinear model is to perform training, which includes feeding multiple search requests to the system, collecting the machine generated ranked results and actual user ranking of results for the requests, and performing curve fitting based on the data to generate a nonlinear ranking model. For example, a nonlinear ranking model used in some embodiments has the following form in some embodiments:

$$y = f(x_1, x_2, \ldots, x_n) = e^{a_1 x_1 + a_2 x_2 + \ldots + a_n x_n} \quad (2)$$

In some embodiments, due to higher computational complexity of a nonlinear function compared to a linear function, the processing speed of ranking using a nonlinear ranking model can be slower than using a linear ranking model under the same conditions (i.e., the same values of features, the same number of pieces of processed information in match, etc.). In order to both achieve a higher ranking speed and ensure search effectiveness, in some embodiments, after the matching information is ranked using the linear ranking model to obtain the first set of ranked results, a selective portion of the first set of ranked results is processed using the nonlinear ranking model.

For example, assuming that the number of matching information items processed using the first linear ranking model is N1. After the first ranking, the higher ranked matching information may generally match what the user would have identified as higher ranking results, but due to the limitation of the linear ranking model, there may still be some discrepancy between the model generated ranking order and actual ranking orders by the users. Thus, the first set of ranked results is further ranked using the nonlinear ranking model. In some embodiments, a number N2 of top ranking matching information items among the first ranked results are ranked using the nonlinear ranking model to obtain the second set of ranked results.

Particularly, N2 can take a value determined dependent upon a specific search demand. Since a user generally pays attention to only the first several pages of search results, N2 can be a smaller value relative to N1, dependent upon the number of matching information items that can be displayed per page. For example, when N1 exceeds a thousand, N2 can be set to 200-400. Alternatively, N2 can be determined using a relative ratio, for example, a ratio of N2 to N1 is 1:10, 1:20, etc. Other appropriate selection criteria can be applied in other embodiments.

At 104, a search response is generated based at least in part on the second set of ranked results. Here, the search engine generates a search response by selecting some of the second set of ranked results. The search response is output and presented to the user.

In the present embodiment, first the number N1 of matching information items are ranked using the linear ranking model, and then the number N2 of top pieces among the ranked results are further ranked using the nonlinear ranking model. Since the processing speed of the linear ranking model can be ensured, first the large number (N1) of matching information items can be preprocessed using the linear ranking model, and then N2<N1 can be set to reduce the amount of data processed using the nonlinear ranking model, thereby improving the processing speed of ranking the matching information as a whole.

Some traditional ranking methods adopt manually designed ranking model and thus is limited to processing of only some simple combinations of features. A learning-to-rank method is an automated technique that takes more features into account than the traditional ranking method. The technique uses data samples to train a ranking model and lets the model learn the practical demand of a user so that ranked results can better accommodate the practical demand of the user. A nonlinear ranking model can be trained to obtain ranked results which are substantially consistent with actual ranked results by the user.

Figure 2:
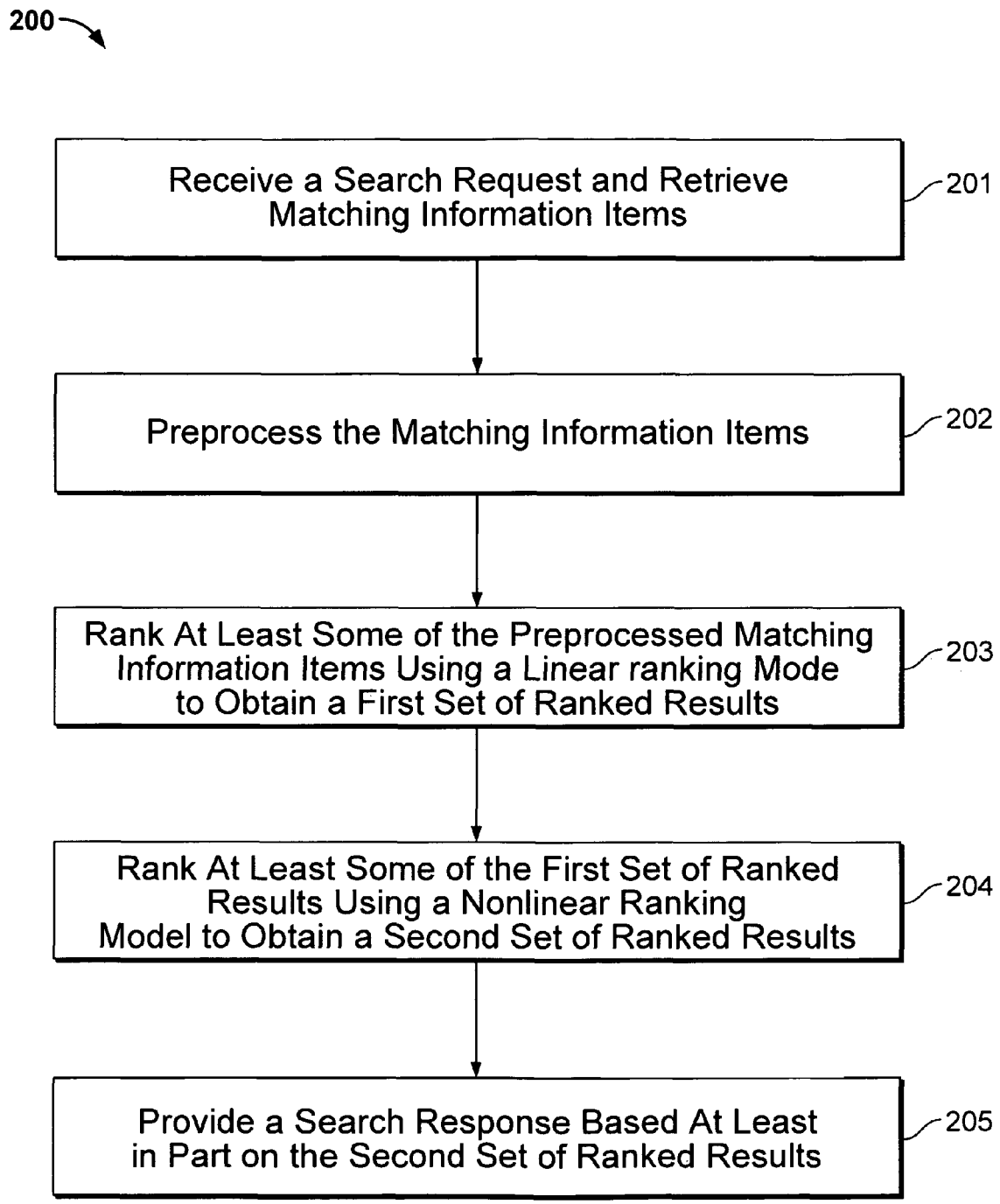
FIG. 2 is a flowchart illustrating another embodiment of a process for processing search results.

In some embodiments, linear and nonlinear ranking models resulting from training can be used respectively for the first and second ranking. Since such models tend to involve more features and thus complex calculation, a preprocessing step is optionally added prior to the first ranking to ensure a processing speed. FIG. 2 is a flowchart illustrating another embodiment of a process for generating a search result.

At 201, a search request is received and information items that match the search request are retrieved.

At 202, the matching information items are preprocessed. In some embodiments, the preprocessing includes a filtering operation that filters out some outdated and invalid matching information items. In some embodiments, the preprocessing includes a sorting operation using some sorting techniques such as Term Frequency-Inverse Document Frequency (TF-IDF), BM25, etc., which adopt a manually designed ranking model involving very few features and thus result in a high speed, but does not produce ranking that closely tracks users' expectations.

At 203, at least some of the preprocessed matching information are ranked using a linear ranking model to obtain a first set of ranked results.

At 204, the first set of ranked results, is further ranked using a nonlinear ranking model to obtain a second set of ranked results.

At 205, a search response is provided based at least in part on the second ranked results.

As can be seen, the effects of step 202 on step 203 are similar to the effects of 203 on the 204. The preprocessing operation is much faster than the linear ranking operation, but does not generate very high quality ranking. It is assumed that a total number N0 of matching information items are retrieved in step 201, and in step 202, for the purpose of performing preprocessing, N1 matching information items among the number N0 pieces of information are selected for processing using the linear ranking model. N1 is less than N0 and thus the processing speed of the first ranking can be significantly improved.

Figure 3A:
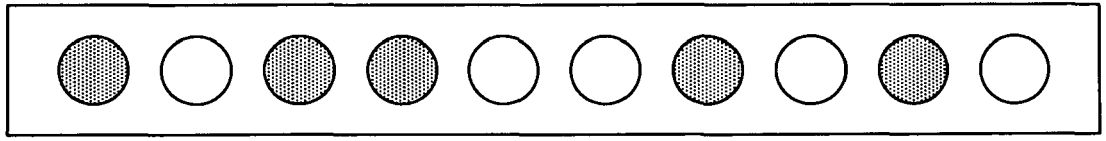
FIGS. 3A-3C are diagrams illustrating the relationships and effects of the preprocessing, the first ranking process and the second ranking process.
Figure 3B:
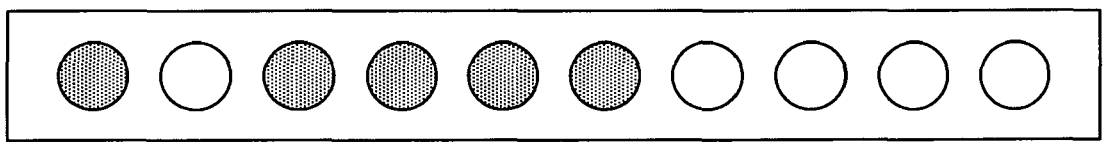
Figure 3C:
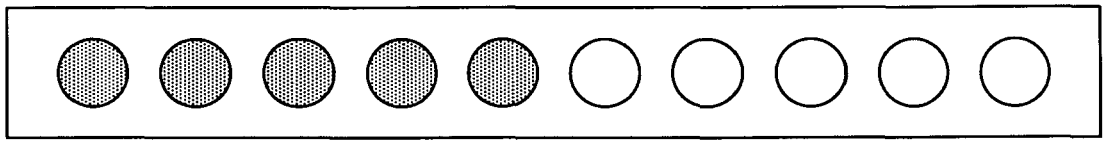

FIGS. 3A-3C are diagrams illustrating the relationships and effects of the preprocessing, the first ranking process and the second ranking process. It is first assumed that a matching information item can be classified, based on the user's actual ranking, into truly relevant matching information or generic matching information. Ranking is for the purpose of ranking the truly relevant matching information as highly as possible. In the example shown, a black circle represents a truly relevant matching information item, and a white circle represents a generic matching information item.

Assuming N0=100, there are a total number 5 of truly relevant matching information items distributed among 100 matching information items (not all of which are shown), and all the 5 truly relevant matching information items are ranked among the top 10 items after preprocessing, as illustrated in FIG. 3A.

Assuming N1=10, the first set of ranking results are illustrated in FIG. 3B. As shown, after applying the linear ranking model, some of the 5 of truly relevant matching information items become ranked more highly than in FIG. 3A.

Assuming N2=6, the second set of ranked results are illustrated in FIG. 3C. As shown, after applying the nonlinear ranking model, the 5 truly relevant matching information items are the top ranking items.

The above example is merely illustrative, and different values of N0, N1 and N2 may apply in various implementations.

In one implementation, N1 is set to be 3000, that is, the top 3000 matching information items among the pre-rank-processed results are first ranked using the following linear ranking model:

$$y_1 = 0.15x_1 + 0.1732x_2 + 0.873x_3 + 0.245x_4 + 0.042x_5$$

Here, $x_1$ to $x_5$ represent values of features of the matching information taken into account in the first ranking.

$x_1$ corresponds to a value of the normalized number of times that a search keyword appears in the text of the matching information. As can be apparent from the model, the larger this value is, the higher a resulting rank score will be.

$x_2$ corresponds to a value of the normalized number of times that the search keyword appears in the title of the matching information. As can be seen from the model, the larger this value is, the higher the resulting rank score will be.

$x_3$ corresponds to a distance among search keywords in the title of the matching information. A user sometimes adopts more than one keyword to search for information. It can be deemed in this case that the shorter the distance among the keywords in the title, the better a demand of the user is accommodated. The value of $x_3$ can be calculated as follows:

1−(distance among keywords)/(total number of words in title)

Particularly, the distance among search keywords is calculated in "words". Any phrase or sentence can be segmented into several "words" by a specific word segmentation rule. For example, if the title of a document that is matched is "Method for selecting computer CPU and monitor", it can be segmented into a total number 7 of words, i.e., Method/for/selecting/computer/CPU/and/monitor by the word segmentation rule. If the search keywords of the user are "computer" and "monitor", the two keywords are spaced by two words in the foregoing title, i.e., at a distance of 2, and the corresponding value of $x_3$ is $1-(2/7)=5/7$.

If the search keywords completely match the title, the distance thereof is 0, and $x_3$ takes a value of 1. If no search keyword appears in the title, $x_3$ takes a value of 0.

$x_4$ corresponds to a compilation distance between the search keyword and the title of the matching information. Similarity of the search keyword and the title of the matching information can also be taken as a factor to score the matching information. The similarity can be measured as a "compilation distance" which is also calculated in "words". For example, if the search keyword of the user is "monitor", the compilation distance thereof to the title "Method for selecting computer CPU and monitor" is 6, and the corresponding value of $x_4$ is $1-(6/7)=1/7$. Thus, if the search keyword completely matches the title, the compilation distance is 0, and $x_4$ takes a value of 1. If the search keyword does not appear in the title, the compilation distance is infinite, and $x_4$ takes a value of 0.

$x_5$ corresponds to a value of the normalized Inverse Document Frequency (IDF) of the search keyword in the text of the matching information.

In this example, $x_1$-$x_5$ are normalized values (being in the interval of [0, 1]) to facilitate calculation using the model. The normalizing method will be unlimited in the embodiment of the application.

The first set of ranked results is further ranked using a nonlinear ranking model to obtain the second set of ranked results.

In one implementation, N2 is assumed to be 600, that is, the top 600 matching information items are secondly ranked using the following nonlinear ranking model:

$$y_2 = \frac{1}{1 + e^{-(0.23x_1 + 0.122x_2 + 0.7653x_3 + 0.189x_4 + 0.156x_5)}}$$

In this example, in the nonlinear ranking model, $x_1$-$x_5$ correspond to the same features of the matching information as those taken into account in the linear ranking model; however, they form a nonlinear relationship with the output y.

In this example, both the linear and nonlinear ranking models in use are models resulting from training. The present embodiment has been proposed in response to an application for a webpage search, an electronic commerce search, etc. The techniques discussed are also applicable to other types of searches, e.g., a book database search, a document database search, etc. Moreover, the application scope will not be limited to the field of Internet, and the techniques can be applied to a search in a stand alone computer, over a local area network, etc.

Figure 4:
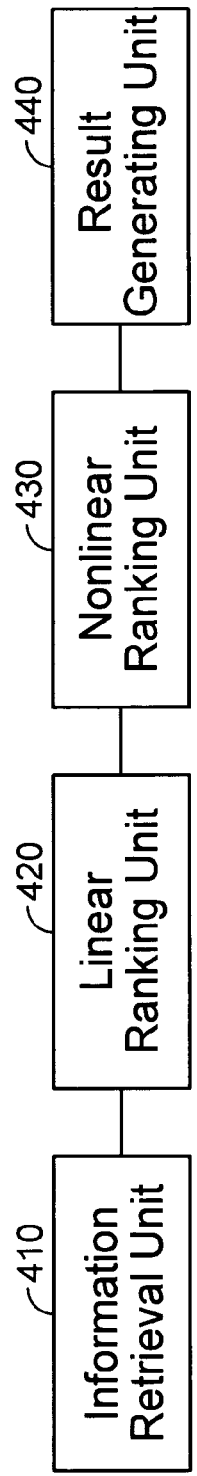
FIG. 4 is a block diagram illustrating an embodiment of a system for generating ranked search results.

FIG. 4 is a block diagram illustrating an embodiment of a system for generating ranked search results. In this example, system 400 may be implemented using one or more computing devices such as general purpose servers, special purpose devices, or other hardware/software/firmware combination that includes one or more processors, and memory coupled to the processors and configured to provide the processors with instructions.

The system includes an information retrieval unit 410 adapted to receive a search request from a user, and to retrieve respective information items that match the search request. It also includes a linear ranking unit 420 adapted to rank, using a linear ranking model, N1 matching information items among the matching information items retrieved by the information retrieval unit 410 to obtain first ranked results, where N1≦ the total number of the retrieved matching information items. It further includes a nonlinear ranking unit 430 adapted to rank, using a nonlinear ranking model, N2 pieces of top matching information among the first set of ranked results obtained by the linear ranking unit 420, to obtain a second set of ranked results, where N2<N1. Since the processing speed of the linear ranking model can be ensured, first the large number (N1) of matching information items can be preprocessed using the linear ranking model, and then N2<N1 can be set to reduce effectively the amount of data processed using the nonlinear ranking model, thereby improving the processing speed of ranking the matching information as a whole. The system further includes a result generating unit 440 adapted to generate a search result from the second set of ranked results.

Figure 5:
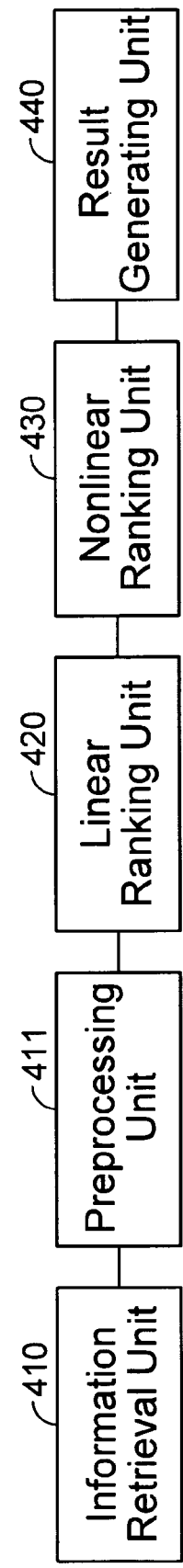
FIG. 5 is a block diagram illustrating another embodiment of a system for generating search results.

FIG. 5 is another embodiment of a system for generating search results. System 500 is similar to 400, with the addition of a preprocessing unit 411 adapted to preprocess the respective matching information items to select N0 matching information items among the respective matching information items as objects to be ranked by the linear ranking unit 420. The preprocessing unit 411 can be used to reduce the amount of data processed by the linear ranking unit 420 to further improve the search processing speed of the entire system without negatively affecting the final search result.

The units described above can be implemented as software components executing on one or more general purpose processors, as hardware such as programmable logic devices and/or Application Specific Integrated Circuits designed to perform certain functions or a combination thereof. In some embodiments, the units can be embodied by a form of software products which can be stored in a nonvolatile storage medium (such as optical disk, flash storage device, mobile hard disk, etc.), including a number of instructions for making a computer device (such as personal computers, servers, network equipments, etc.) implement the methods described in the embodiments of the present invention. The units may be implemented on a single device or distributed across multiple devices. The functions of the units may be merged into one another or further split into multiple sub-units.

The foregoing information search system can be applied to a search engine for a search over the Internet and also to an information search system for a search in a stand alone computer, over a local area network, etc.

The foregoing devices have been described by being functionally divided into separately described respective units for convenience of the descriptions. Of course, the functions of the respective units can be performed in the same one or more items of software and/or hardware to implement the invention.

As can be seen from the foregoing descriptions of the embodiments, those skilled in the art can clearly understand that the application can be implemented in a manner of software plus an essential general-purpose hardware platform. Based upon such understanding, the technical solutions of the application or a part thereof contributing to the prior art can essentially be embodied in the form of a software product, which can be stored in a storage medium, e.g., an ROM/RAM, a magnetic disk, an optical disk, etc., and which includes a number of instructions to cause a computer device (which may be a personal computer, a server, a network device, etc.) to perform the methods according to the respective embodiments of the application or according to some parts of the embodiments.

The respective embodiments in the specification have been progressively described and their common or similar parts can be taken for mutual reference, and each of the embodiments has placed an emphasis on its difference(s) from the other embodiment(s). Especially for the embodiments of the system, they are substantially similar to the embodiments of the method and therefore have been described briefly, and for details thereof, reference can be made to those parts of the descriptions of the embodiments of the method. The foregoing embodiments of the system are merely illustrative, where the units described as separate components may or may not be physically separate, and the components illustrated as units may or may not be physical units, that is, may be co-located or distributed on plural network units. A part or all of the modules therein can be selected as required in practice to attain the object of the solutions of the embodiment in question.

The application can be applied in numerous general-purpose or dedicated computer system environments or configurations, e.g., a personal computer, a server computer, a handheld or portable device, a flat panel device, a multi-processor system, a microprocessor based system, a set top box, a programmable consumer electronic device, a network PC, a miniaturized computer, a large-scale computer, a distributed computing environment including any of the foregoing system or devices, etc.

The application can be described in a general context of computer executable instructions, e.g., a program module, for execution by a computer. Generally, the program module includes a routine, program, object, component, data structure, etc., which executes a specific task or embodies a specific abstract type of data. Alternatively, the application can be implemented in a distributed computing environment in which a task is executed by a remote processing device connected over a communication network and in which the program module can be located in a local or remote computer storage medium including a storage device.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method for generating ranked search results, comprising:
   receiving a plurality of matching information items that match a search request;
   ranking at least some of the plurality of matching information items using a linear ranking model that linearly combines a first plurality of feature values to obtain a first set of ranked results, wherein the linear ranking model combines the first plurality of feature values in a linear fashion using weight coefficients corresponding to the first plurality of feature values;
   ranking at least some of the first set of ranked results using a nonlinear ranking model that nonlinearly combines a second plurality of feature values to obtain a second set of ranked results, wherein the nonlinear ranking model combines the second plurality of feature values in a nonlinear fashion using weight coefficients corresponding to the second plurality of feature values; and
   providing a search response based on the second set of ranked results.

2. The method of claim 1, wherein the first set of ranked results includes a greater number of matching information items than the second set of ranked results.

3. The method of claim 1, wherein the plurality of matching information items are a second plurality of matching information items; and the method further comprising:
   receiving the search request;
   generating a first plurality of matching information items;
   preprocessing the first plurality of matching information items; and
   selecting from the first plurality of matching information items the second plurality of matching information items.

4. The method of claim 3, wherein the first plurality of matching information items includes a greater number of matching information items than the second plurality of matching information items.

5. The method of claim 1, wherein the linear ranking model outputs a first ranking score and the nonlinear ranking model outputs a second ranking score.

6. The method of claim 1, wherein at least some of the first plurality of feature values used by the linear ranking model are the same as at least some of the second plurality of feature values used by the nonlinear ranking model.

7. The method of claim 1, wherein the first plurality of feature values are determined by the matching information, the search request, or both.

8. The method of claim 1, wherein the nonlinear ranking model is determined by training.

9. A system for generating ranked search results, comprising:
   one or more processors configured to:
      receive a plurality of matching information items that match a search request;
      rank at least some of the plurality of matching information items using a linear ranking model that linearly combines a first plurality of feature values to obtain a first set of ranked results, wherein the linear ranking model combines the first plurality of feature values in a linear fashion using weight coefficients corresponding to the first plurality of feature values;
      rank at least some of the first set of ranked results using a nonlinear ranking model that nonlinearly combines a second plurality of feature values to obtain a second set of ranked results, wherein the nonlinear ranking model combines the second plurality of feature values in a nonlinear fashion using weight coefficients corresponding to the second plurality of feature values; and
      provide a search response based at least in part on the second set of ranked results;
   one or more memories coupled to the one or more processors, configured to provide the processors with instructions.

10. The system of claim 9, wherein the first set of ranked results includes a greater number of matching information items than the second set of ranked results.

11. The system of claim 9, wherein the plurality of matching information items are a second plurality of matching information items; and the one or more processors are further configured to:
   receive the search request;
   generate a first plurality of matching information items;
   preprocess the first plurality of matching information items; and
   select from the first plurality of matching information items the second plurality of matching information items.

12. The system of claim 11, wherein the first plurality of matching information items includes a greater number of matching information items than the second plurality of matching information items.

13. The system of claim 9, wherein the linear ranking model outputs a first ranking score and the nonlinear ranking model outputs a second ranking score.

14. The system of claim 9, wherein at least some of the first plurality of feature values used by the linear ranking model are the same as at least some of the second plurality of feature values used by the nonlinear ranking model.

15. The system of claim 9, wherein the first plurality of feature values are determined by the matching information, the search request, or both.

16. The system of claim 9, wherein the nonlinear ranking model is determined by training.

* * * * *